United States Patent
Mayer

(10) Patent No.: US 6,785,557 B2
(45) Date of Patent: *Aug. 31, 2004

(54) METHOD OF TRANSMITTING DATA, IN PARTICULAR GSM DATA

(75) Inventor: Ralf Mayer, Aspach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/424,065

(22) Filed: Apr. 25, 2003

(65) Prior Publication Data

US 2003/0195011 A1 Oct. 16, 2003

Related U.S. Application Data

(63) Continuation of application No. 09/068,155, filed as application No. PCT/DE96/01683 on Sep. 7, 1996, now Pat. No. 6,556,844.

(30) Foreign Application Priority Data

Nov. 29, 1995 (DE) .......................................... 195 44 367

(51) Int. Cl.$^7$ ........................... H04B 1/38; G10L 21/00; H04Q 7/20; H04Q 7/00; H04J 3/12
(52) U.S. Cl. ...................... 455/560; 455/436; 370/328; 370/523; 704/212; 704/221; 704/228
(58) Field of Search ................................ 455/560, 436, 455/423, 445; 704/221, 212, 200, 228, 226; 375/222, 219; 341/50; 370/328, 523

(56) References Cited

U.S. PATENT DOCUMENTS

| | | | |
|---|---|---|---|
| 4,924,480 A | | 5/1990 | Gay et al. |
| 5,091,945 A | | 2/1992 | Kleijn |
| 5,513,211 A | | 4/1996 | Yabusaki et al. |
| 5,608,779 A | | 3/1997 | Lev et al. |
| 5,953,666 A | | 9/1999 | Lehimaki |
| 5,956,673 A | * | 9/1999 | Weaver et al. ............... 704/221 |
| 6,556,844 B1 | * | 4/2003 | Mayer ......................... 455/560 |

FOREIGN PATENT DOCUMENTS

| | | | |
|---|---|---|---|
| EP | 0 332 345 | 9/1989 | |
| EP | 0332345 A2 | * 9/1989 | ................. 375/222 |
| WO | WO 95 24789 | 9/1995 | |
| WO | WO 96 23297 | 8/1996 | |
| WO | WO 96 32823 | 10/1996 | |

* cited by examiner

Primary Examiner—Lee Nguyen
Assistant Examiner—Raymond B. Persino
(74) Attorney, Agent, or Firm—Kenyon & Kenyon

(57) ABSTRACT

The data stream between the transcoders (TCE1, TCE2) of a mobile wireless system is subdivided into a first data stream with samples for transmission and a second data stream with signal parameters for reconstruction of user data and/or for signaling. Both data streams are transmitted at the same time in particular in a handshake phase.

The invention permits an improvement in the quality of transmitted data, e.g., speech data in a GSM network in tandem operation between mobile subscribers, in particular during a handshake phase.

8 Claims, 2 Drawing Sheets

| Pattern | Description | Value |
|---|---|---|
| TRAU | TRAU frame according to GSM Recommendation 08.60 | |
| IDLE | Idle pattern of the A-IF '01010100' | 01010100 |
| PCM | Data different from idle, e.g., speech samples | |
| TRAU* | Special TRAU frame with sync information | |
| IDLE* | Idle only in upper six bits '010101' | 010101-- |
| PCM* | Speech data only in the upper six bits | dddddd-- |
| PCM⁺ | Speech data in the upper six bits; the lower two bits are zero | dddddd00 |

METHOD OF TRANSMITTING DATA, IN PARTICULAR GSM DATA

This application is a continuation of Ser. No. 09/068,155 filed May 14, 1998, now U.S. Pat. No. 6,556,844 which is a 371 of PCT/DE96/01683 filed Sep. 7, 1996.

FIELD OF THE INVENTION

The present invention relates to a method of transmitting data, in particular GSM data, between at least two subscribers.

BACKGROUND

With previous GSM data circuits, in particular for digitized speech data between mobile stations over a communication network, such as the public telephone system (PSTN—public switched telephone network), GSM data in GSM format has been converted by a transcoder to the frame format of the communication network (64 kbit/s PCM for PSTN). With the DMCS 900 mobile wireless system, such transcoding takes place at the base stations or at the A interface in transfer to the PSTN communication network. According to GSM Recommendation 0860/0861, digital speech transmission takes place in TRAU frames (TRAU= transcode and rate adaptor unit), i.e., transmission frames in 16 kbit/s format for FR (full rate) transmission and 8 kbit/s or 16 kbit/s for HR (half rate) transmission.

U.S. Pat. No. 5,091,945 describes that instead of speech data, it is possible to transmit only signal parameters (speech parameters) from which the user data can be reconstructed. EP 0 332 345 describes that speech sampling values can be transmitted in a first data stream and a synchronization model can be transmitted.

International patent application WO 96/23297, which was first published after the priority date of the present application, describes that speech sampling values can be transmitted in a first data stream and identification information and speech parameters for speech-data reconstruction can be transmitted in a second data stream. A substantial disadvantage of the data-transmission method described in WO 96/23297 is that the identification information is permanent. WO 96/23297 corresponds to the European patent application EP 806 032.

SUMMARY OF THE INVENTION

According to the present invention, an improvement is achieved in the quality of the data transmitted, specifically GSM speech data, in particular in tandem operation with connections between mobile stations. Due to the simultaneous transmission of samples, e.g., PCM values, and signal parameters for reconstruction of the speech data, this reduces interference when using a transcoder that is not equipped for tandem-free operation with transparent switching of TRAU frames. Even when identification information is transmitted, speech data is still transmitted in the first data stream.

The present invention also improves handover operation. The present invention can be implemented easily in existing systems. Only the speech transcoders of a network are affected. For example, of the 8 bits per speech sample, the two least-significant bits are replaced by a TRAU frame (speech is then reduced to 6 bits) into which identification information and/or synchronization information can be inserted to synchronize the transcoders.

By squeezing the lowest-order bits to zero in transmission of speech samples when establishing a voice connection, the speech quality is improved.

In a handover, i.e., when changing to another transcoder, frame loss can be ascertained rapidly, and it is possible to prevent invalid frames from being processed further as TRAU frames. A transcoder that is not equipped for tandem-free operation can process speech samples during a synchronization operation. If a reduced idle pattern is sent instead of samples after synchronization is concluded, the speech decoder of the transcoder can be switched off or used for other purposes, e.g., for full rate/half rate code conversion in the downlink path.

DETAILED DESCRIPTION

Figure 1:
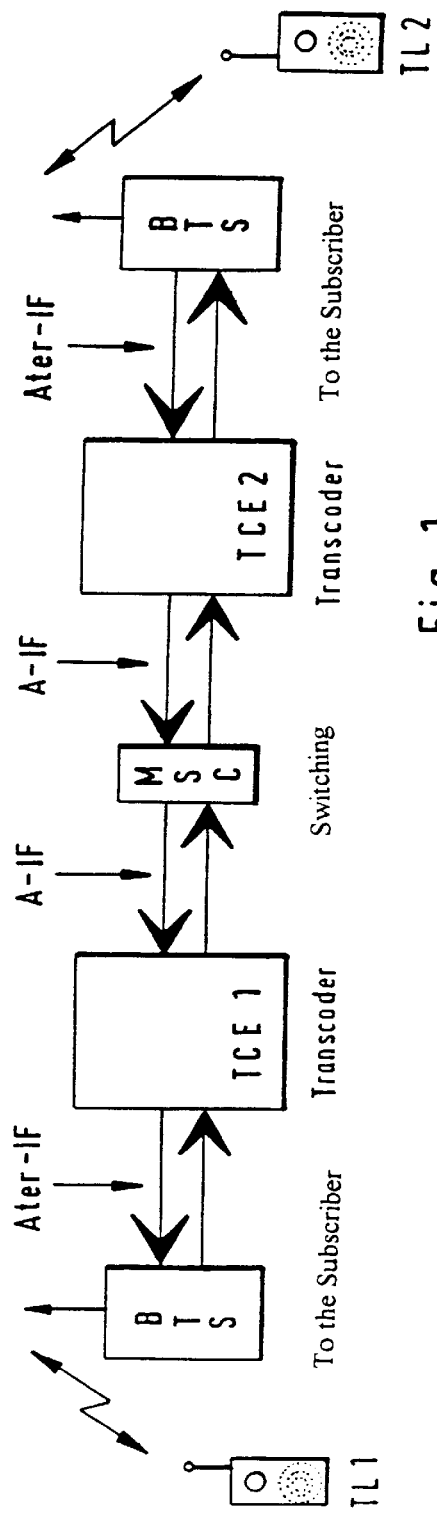
FIG. 1 shows an exemplary call connection between two stations according to the present invention.
Figure 2:
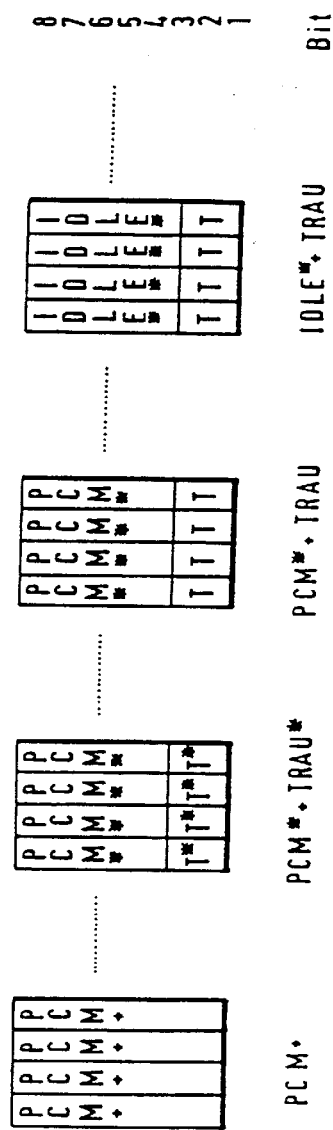
FIG. 2 shows the data of an exemplary transmission interface in chronological sequence according to the present invention.

In the existing GSM network (fixed network side), e.g., the DMCS 900 network, transcoding—i.e., recoding the speech data from the given TRAU (transcode and rate adaptation unit) format according to GSM Recommendation 08.60 to the transmission format of the communication network, e.g., the public telephone network PSTN (PCM values in the 64 kbit/s frame format)—is always performed.

Subscriber T11 initiates a connection with subscriber T12. The transcoding device, hereinafter always referred to as a transcoder, TCE1 assigned to subscriber TL1 sends identification in the traffic channel of the A interface A-IF, signaling to transcoder TCE2 (tandem-) thus connected that it is a transcoder capable of TFO (tandem-free operation). The two transcoders switch to TFO after they have recognized this signal and then exchange speech parameters. If the transcoder encounters a non-TFO-capable transcoder, it will not receive the identifier of the remote station within a certain period of time and therefore will return to normal operation in which it codes and decodes the speech (speech samples).

The interfaces of transcoders TCE1, TCE2 with subscribers T11, T12, which can be connected over fixed wireless stations BTS, for example, are designated as ATER-IF. Switching between transcoders is designated as MSC.

Connecting a Call

When connecting a call, detection of the transfer at the A interface (A-IF) in the two lower (least significant) bits of the A samples from 00 to 00 represents the trigger. The trigger may optionally be delayed by $T_{trigger}$.

This trigger condition is selected so as to comply with the following performance of the switching equipment MSC:

a) The MSC sends a non-busy transcoder an IDLE pattern.

b) In the handshake, the MSC first switches a loop between the input and output of the line to the transcoder before it switches through.

c) The MSC switches the two directions through at different rates. This can be equalized with $T_{trigger}$.

Arbitration Procedure

Transcoder TCE1 then sends a TRAU frame (which has previously been used for transmission between the wireless station and transcoder and contains signal parameters for reconstruction of user data) in the least significant two bits of these samples instead of the usual 8 bit PCM samples to the A-IF interface. The data stream between transcoders TCE1 and TCE2 is then subdivided into a first data stream with samples (PCM values) and a second data stream with signal parameters, specifically TRAU frames. Both data streams are transmitted at the same time, in particular during a handshake phase. In such a TRAU frame, TRAU* identification information is sent for a predetermined period of time. As soon as the TRAU* has been recognized by the remote station, they switch to TFO. This process is monitored by a timer $T_{sync}$. When it runs out, they switch to normal operation.

As an alternative, n, n<9 bits for signaling can also be used with any desired frame structures.

As an alternative, the TRAU* identification information can be omitted and only the TRAU frame synchronization information used.

As long as the synchronization $T_{sync}$ is running, the TRAU frames arriving from the $A_{ter}$-IF are sent in the least significant two bits of A-IF following the TRAU* identification information. This permits immediate transfer to TFO in the remote station after receipt of the TRAU* identification information. The more significant six bits of the samples are filled with the processed more significant six bits PCM*. This reduces the quality loss if the remote station is not a TFO-capable transcoder.

If no TRAU* is received within a repeat time $T_{repeat}$ ($T_{repeat}<T_{sync}$), a TRAU* is sent again. The purpose of this second TRAU* is described in the handover case.

TFO (Tandem-free Operation)

After recognizing the TRAU* at the A-IF, the following TRAU frames (contents) are subsequently sent through to $A_{ter}$-IF. Adaptation of the control bits and timing of the $A_{ter}$-TRAU frame is adapted to the local conditions. Non-relevant frames from the remote station (BFI=1, TRAU*) are replaced by a preceding frame and muting is optionally initiated. Any jitter in the TRAU frame length of ±2 bits must also be compensated. Codec conversions, DTX and muting functions are also performed in this direction. The advantage is that no signaling is necessary during the conversation if local conditions change.

In the opposite direction, TRAU frames are sent transparently from the $A_{ter}$-IF to the A-IF. The upper six bits are then replaced by IDLE* (010101) instead of PCM*. This makes it possible to switch off the transcoder function, because this capacity may be needed for the HRC→→FRC conversion in an FR/HR system environment. It also avoids additional operating time. TRAU frames with data content can also be sent through transparently.

Instead of IDLE*, a modulo-n counter can also be installed, permitting even more reliable error detection.

Handover

The handover case is subdivided into the three cases described below.
  a) Handover to a TFO-capable transcoder First, termination of the incoming TRAU frames is recorded and a timer $T_{release}$ is started. After a certain period of time, the transcoder again receives a TRAU* from the newly connected transcoder TCE2, stops $T_{release}$, sends a TRAU* itself and remains in TFO. The transcoder can thus remain in TFO continuously.

If the first TRAU* cannot be received, because the switching MSC has not yet switched through, its second TRAU* is detected, however, and results in TFO.

Figures 3, 4:
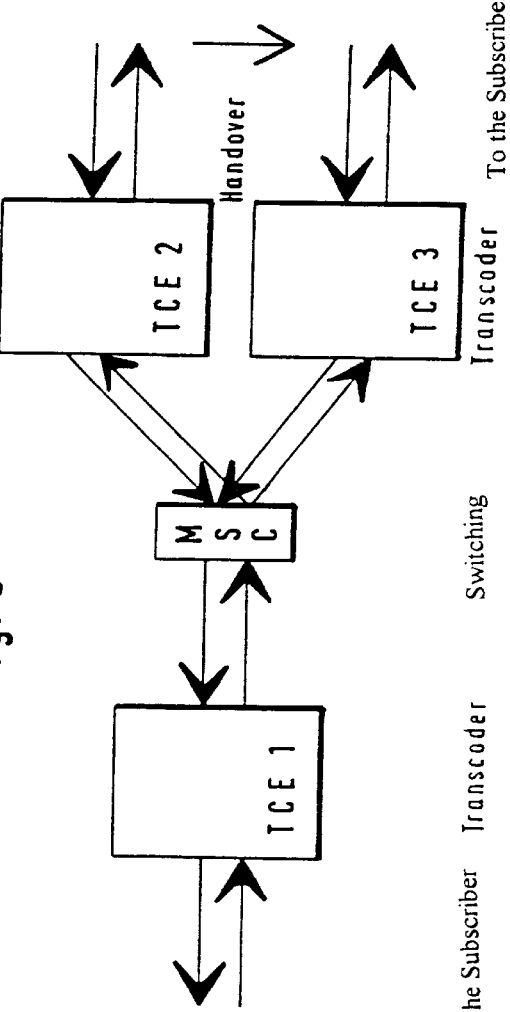
FIG. 3 shows the patterns used in FIG. 2.
FIG. 4 shows an exemplary handover operation according to the present invention.

To detect the handover from transcoder TCE2 to transcoder TCE3 as rapidly as possible and not trigger on a loop on the A-IF, the newly connected transcoder TCE3 (FIG. 4) will send "PCM+" during the handshake. "PCM+" is PCM data with the lower two bits at '00' so as not to simulate TRAU sync bits. This permits suppression of interference at the subscriber's end.
  b) Handover to a non-TFO-capable transcoder First, termination of the incoming TRAU frames is recorded and a timer $T_{release}$ is started. Timer $T_{release}$ runs out and the transcoder returns to the arbitration state in which it encodes the incoming data at the A-IF. It attaches PCM samples "PCM*," which are now decoded, to the TRAU frames in the outgoing data stream at A-IF. The TRAU sent first is a TRAU*. Timer $T_{sync}$ is started. Since no TRAU* had been received before timer $T_{sync}$ ran out, the transcoder returns to normal operation.
  c) Handover from a non-TFO-capable transcoder If the previous remote station was not TFO-capable, the transcoder cannot recognize the handover. For the new remote station, however, it is a normal handshake in which it first sends a TRAU* if it is TFO-capable. The transcoder receives it, likewise sends a TRAU* and goes into TFO mode. If the switching is delayed, the first TRAU* is lost and the second TRAU* after $T_{repeat}$ leads to success.

Termination of Call

The end of a call is initiated either by termination of the TRAU frames on the $A_{ter}$-IF or by detected errors on the A-IF. The sequence is then the same as in the case of the above-described "handover to a non-TFO-capable transcoder."

Behavior When There are Errors in TFO a) Individual errors on the A-IF Individual errors cannot be recognized in the data bits of the TRAU frame. Individual errors can be recognized only in the synchronization bits of the TRAU frames. No measures can be derived from this because there is no information regarding the data bits of the TRAU frame.
  b) Burst error on the A-IF Routing TRAU frames with a great deal of interference to the Ater-IF means that severe interference noise may occur at the subscriber's end. Therefore, when a single error is detected, a burst error is assumed, the remaining TRAU frame is discarded and replaced by the TRAU frame sent previously. The following measures largely prevent such interference:

1. Double Error Monitoring Procedure:
    1.1 by monitoring the (TRAU) frame synchronization,
    1.2 by monitoring the IDLE* pattern in the upper six bits, as an alternative to 1.2: monitoring by a periodic pattern, e.g., of a modulo-n counter, whose counts are transmitted in the first data stream.
    2) Error masking buffer A buffer with approximately x ms (5 ms here) allows storage of the data up to the last TRAU sync bit and replacement by the last valid data in the event of an error.
  If the burst is very long, the transcoder switches to normal operation as in the case of the above-described "handover to a non-TFO-capable transcoder."

What is claimed is:

1. A method for transmitting digitized data between a calling subscriber unit and a called subscriber unit of a mobile radio network using a predefined frame format, comprising:

establishing a connection between the calling subscriber unit and the called subscriber unit, signaling, with the aid of a first transcoding device assigned to the calling subscriber unit, to a second transcoding device assigned to the called subscriber unit, that the first transcoding device is capable of tandem-free operation, the signaling taking place for a predefined period of time;

switching over the first and second transcoding devices to a tandem-free operation, after they have detected the signaling; and exchanging speech parameters between the first and second transcoding devices;

wherein a data stream between the first and second transcoding devices is subdivided into a first data stream having speech sampling values and a second data stream, during both the signaling and the exchanging of speech parameters, and wherein the second data stream contains identification information during the signaling and contains speech parameters for speech-data reconstruction during the exchanging, and wherein the signal parameters are transmitted in transcoding rate adaption unit frames immediately after the transmission of the identification information.

2. The method according to claim 1, wherein transcoding rate adaption unit frames for mobile wireless systems are used for signal parameters of the second data stream.

3. The method as recited in claim 1, wherein the first data stream includes the more significant bits of a parallel bit sequence, and the second data stream includes the less significant bits of the parallel bit sequence.

4. The method as recited in claim 3, wherein the second data stream is formed by reducing the data of the first data stream.

5. The method as recited in claim 3, wherein the more significant bits are transmitted as PCM sampling values.

6. The method according to one of claim 1, wherein the second transcoding device signals to the first transcoding device that the second transcoding device is capable of tandem-free operation, after the second transcoding device has received the identification information from the first transcoding device.

7. The method according to one of claim 1, wherein, after a transition into the tandem-free operation, the identification information is transmitted between the first and second transcoding devices while embedded in transcoding rate adaption unit frames.

8. The method according to one of claim 1, wherein, from the tandem-free operation, a handover from one of the first and second transcoding devices to another tandem-free-operation-capable transcoding device or a non-tandem-free-operation-capable transcoding device is performed.

* * * * *

UNITED STATES PATENT AND TRADEMARK OFFICE
CERTIFICATE OF CORRECTION

PATENT NO. : 6,785,557 B2
DATED : August 31, 2004
INVENTOR(S) : Ralf Mayer

It is certified that error appears in the above-identified patent and that said Letters Patent is hereby corrected as shown below:

Title page,
Item [57], ABSTRACT,
Line 1, change "The data stream between the transcoders" to -- A data stream between transcoders --.
Line 1, delete "(TCE1, TCE2)".
Line 6, change "same time in particular in a hand shake phase." to -- same time, --.
Between lines 6 and 7, delete space.
Line 7, change "The invention permits" to -- permitting --.
Line 9, delete "in particular during a handshake phase".

Column 3,
Line 50, change "for the HRC→→FRC" to -- for the HRC←→FRC, --.

Signed and Sealed this

Sixteenth Day of August, 2005

JON W. DUDAS
*Director of the United States Patent and Trademark Office*